Patented June 5, 1951

2,555,665

UNITED STATES PATENT OFFICE 2,555,665

USE OF A MONO-ETHER OF ETHYLENE GLYCOL TO ACTIVATE EMULSION POLYMERIZATION IN THE PRESENCE OF A HEAVY MERCAPTAN

Walter A. Schulze and Willie W. Crouch, Bartlesville, Okla., assignors to Phillips Petroleum Company, a corporation of Delaware No Drawing. Application June 14, 1946, Serial No. 676,860

4 Claims. (Cl. 260—84.3)

This invention relates to a process for the polymerization of polymerizable organic compounds. In one of its specific embodiments, this invention relates to a process for the copolymerization of butadiene and an organic monomer copolymerizable therewith in an aqueous emulsion. In one of its specific aspects it relates to the emulsion polymerization of a conjugated diolefin in the presence of a mercaptan modifier and a glycol mono-ether. This application is a continuation-in-part of our copending application, Serial No. 569,902, filed December 26, 1944, now Patent 2,472,232, granted June 7, 1949.

In the manufacture of synthetic rubber by emulsion polymerization wherein a polymerizable organic monomer is emulsified in an aqueous soap solution to provide a reaction medium for the production of a synthetic latex, primary consideration must be given to the quality of the resulting polymer, especially as regards tack, cohesiveness and milling characteristics. Thus, in a widely used process for the manufacture of butadiene-styrene copolymers, extensive experience has established that a reaction period of about 15 hours at 50° C. resulting in a conversion of monomers of 75 to 80 per cent is necessary in order to produce higher quality polymers compatible with economically feasible reaction times. These conditions represent a compromise between product quality and economical operation. Thus it is obvious that with a polymerization period of 15 hours, equipment investment costs are necessarily high in order to achieve large scale production. An obvious expedient for the reduction of the reaction time is to increase the reaction temperature; however, it is well known that the quality of the product is degraded rapidly with increasing temperatures. It is also well known that as the reaction temperature is decreased the quality of the polymeric product improves. If the reaction temperature is adjusted to give a polymer of optimum characteristics, the rate of polymerization is reduced to such an extent that the process becomes economically unfeasible. It is immediately apparent that a means for increasing polymerization rate without sacrificing the polymer quality would be an advantageous contribution to the art of emulsion polymerization.

During the course of the polymerization reaction it is customary to control the polymerization, to some extent at least, by the use of chemical materials known as modifiers. The function of the modifier in the polymerization recipe is to direct the polymerization reaction in such a manner that uniform, long-chain polymers are produced with a minimum of cross-linkages between polymer molecules. Cross-linkage between the polymer units leads to the formation of benzene insoluble gel-type products and, consequently, to undesirable characteristics in the polymer. A further function of the modifier is to control the molecular weight of the polymer, as evidenced by its intrinsic viscosity. Among the materials employed as modifiers, high molecular weight alkyl mercaptans, i. e., mercaptans containing 8 or more carbon atoms per molecule, have been found particularly effective and have been rather widely used. An alkyl mercaptan containing 12 carbon atoms per molecule is most frequently used in the manufacture of butadiene-styrene copolymers of the GR–S type. It has been observed that primary and tertiary mercaptans containing more than 12 carbon atoms to the molecule are generally relatively sluggish in their modifying action and, in many instances, their use leads to under-modified products. On the other hand, mercaptans containing more than 12 carbon atoms per molecule result in the production of more uniformly modified polymers than are obtained when the dodecyl mercaptans are used as modifiers. We have now found that the modifying action of mercaptans containing more than 12 carbon atoms per molecule can be activated in accordance with the present invention to take full advantage of their uniform modifying properties and at the same time to modify the polymer at a rate comparable to the dodecyl mercaptan. We have also found that the rate of the polymerization reaction at a given temperature is substantially increased by the process of our invention.

Among the unsaturated organic compounds which are capable of copolymerizing with conjugated diolefins, referred to also as butadiene hydrocarbons, in an aqueous emulsion are: aryl olefins and substituted aryl olefins (e. g., styrene, p-chlorostyrene, p-methoxystyrene, vinyl naphthalene, and the like); alkyl esters of acrylic acid (e. g., methyl acrylate, methyl methacrylate, butyl acrylate and the like); nitriles of acrylic acids (e. g., acrylonitrile, methacrylonitrile, and the like); vinylidine chloride; vinyl ketones (e. g., methyl vinyl ketone); vinyl ethers; vinyl carbazoles; vinyl furan; vinyl pyridine; and the like.

The present invention provides an improved process for the emulsion polymerization of polymerizable organic compounds as employed in the manufacture of synthetic rubber of the GR–S type and similar products. By the process of the present invention synthetic rubbers having improved properties may be produced. The improve demulsion polymerization process and synthetic rubber products are the result of our discovery that the modifying action of mercaptans containing more than 12 carbon atoms to the molecule can be activated by the presence of relatively small amounts of selected mono-ethers of ethylene glycol. In addition to improvement in the action of the modifier, the polymerization rate is substantially increased. The process of this invention is particularly adapted for use in operations wherein polymerization is carried out in an aqueous emulsion, particularly the emulsion polymerization of conjugated diolefins either alone or in admixture with other polymerizable organic compounds, as typified by butadiene-styrene and similar comonomer systems. Glycol mono-ethers useful as activating agents in accordance with our invention may be either alkyl or aryl mono-ethers, and more specifically, comprise ethyl, propyl, isopropyl, butyl, isobutyl, secondary butyl, tertiary butyl, amyl, phenyl, and tolyl mono-ethers of ethylene glycol.

An object of this invention is to provide an improved process for the polymerization of polymerizable organic compounds. Another object is to provide an emulsion polymerization process which is particularly useful for the production of copolymers of butadiene and styrene. Still another object is to provide such a process wherein modification of the polymer is improved and a reduction in polymerization time is realized without impairment of product quality. A further object is to provide improved high molecular weight polymers of unsaturated organic monomers, especially copolymers of butadiene and styrene.

In the practice of our invention, the glycol mono-ether activator can be emulsified in a soap solution along with the usual ingredients comprising the monomeric materials, the polymerization catalyst, and the modifier. When operating in this manner the activating influence of the mono-ether is effective throughout the reaction. In another embodiment of our process, the activator is supplied after the reaction has proceeded for a time, say when a conversion of about ten per cent is attained. This procedure often provides a more evenly modified polymer since the modifying action of the unactivated mercaptan is usually adequate during the earlier stages of the reaction.

The activating agents of our invention are usually employed in quantities ranging from 1 to 20 weight per cent based on the weight of monomers in the recipe although we have preferred to operate with amounts varying from 2 to 10 weight per cent. The degree of activation in modifier action realized from the use of our novel agents is dependent upon the quantity and the specific type of mono-ether employed, the mercaptan modifier used, and the like. However, the addition of 5 to 10 parts of a suitable ethylene glycol mono-ether per 100 parts of monomers in a butadiene-styrene system modified with a $C_{14}$ or higher mercaptan provides increases of 50 to 100 per cent or more in the benzene solubility of the product and a reduction in intrinsic viscosity of similar magnitude. The amount of mercaptan modifier used is often less than 1 per cent, as illustrated in the following examples, and generally will not exceed 2 per cent, by weight, based on the weight of polymerizable organic compounds charged to the reaction.

An advantage of the present invention lies in the increased range of mercaptans made available as modifiers by the application of our activating agents. By our process both primary and tertiary mercaptans containing 14, 16 and higher numbers of carbon atoms to the molecule may be employed to provide evenly modified and substantially gel-free polymers. A further advantage of our process lies in the fact that the mono-ethers of our invention do not participate in the polymerization per se to any appreciable extent and are therefore available for recovery upon completion of the reaction if desired.

Another very important advantage of our process lies in the fact that the ethylene glycol mono-ethers of our invention not only operate as activators for the modifier to provide polymers of preferred properties, but also are known for their powerful promoting influence on the polymerization reaction, as disclosed in our copending application, Serial No. 569,902, filed December 26, 1944, now U. S. Patent 2,472,232. Thus according to the methods of our invention primary, secondary and tertiary mercaptans in the $C_{14}$ and higher range can be employed to provide a higher degree of conversion of monomers to fully modified polymers in a minimum reaction time.

Our glycol mono-ethers are particularly effective for the activation of modifier action in emulsion polymerization systems employing conjugated diolefins such as butadiene, isoprene, piperylene, and the like, either alone or in admixture with each other or with other polymerizable organic compounds such as styrene, dichlorostyrene, vinyl pyridine, acrylonitrile, and the like. The benefit of our activating agents is of especially practical value when used in butadiene-styrene systems such as those employed in the conventional GR–S recipe.

The ethylene glycol mono-ethers of our invention are also of particular value in activating the modifiers in low soap recipes which are now of some interest in the polymerization art, and with which a principal difficulty lies in under-modification of the product.

*Example I*

Four polymerization tubes were charged with the following recipe:

| | Parts |
|---|---|
| Butadiene | 75 |
| Styrene | 25 |
| Soap (S F-Flakes) | 5 |
| Potassium persulfate | 0.3 |
| Water | 180 |

Two of the tubes were charged with 0.40 part of commercial primary dodecyl mercaptan and two with 0.70 part of primary $C_{14}$ mercaptan as modifier. One tube from each pair was treated with ten parts of ethylene glycol mono-phenyl ether, while the other two were maintained as controls. The tubes were agitated in a water bath at 50° C. for various periods of time to obtain about 70 per cent conversion. The polymers were coagulated with alum, inhibited with phenyl-beta-napthylamine and dried for 24 hours at 150° F. Determinations were made on the products for intrinsic viscosity, benzene solubility, and conversion. The results are shown below.

| Modifier | Ethylene Glycol Mono-Phenyl Ether | Time | Conversion | Intrinsic Viscosity | Benzene Solubility |
|---|---|---|---|---|---|
| | Parts | Hours | Per cent | | Per cent |
| Commercial Primary dodecyl Mercaptan (DDM) | 0 | 11.5 | 70.2 | 2.26 | 100 |
| | 10 | 7.0 | 64.0 | 2.16 | 100 |
| p-$C_{14}$ Mercaptan | 0 | 11.5 | 63.8 | ------ | 50.3 |
| | 10 | 7.0 | 63.2 | 2.03 | 100.0 |

From the above results it is evident that with the primary dodecyl mercaptan composition there was no appreciable activating effect from the ethylene glycol mono-phenyl ether, insofar as gel formation was concerned, but there was a faster polymerization rate and a lower intrinsic viscosity for the product, when the ethylene glycol mono-phenyl ether was present. However in the tests with primary $C_{14}$ mercaptan the unactivated recipe showed high gel formation while with ten parts of the mono-ether, the polymer was wholly benzene soluble. The presence of gel in the unactivated sample is evidence of cross linkage in the polymer.

*Example II*

The experiment of Example I was repeated employing 0.80 parts of tertiary $C_{16}$ mercaptan as the modifier. Results are shown below.

| Ethylene Glycol Mono-Phenyl Ether | Time | Conversion | Intrinsic Viscosity | Benzene Solubility |
|---|---|---|---|---|
| Parts | Hours | Per cent | | Per cent |
| 0 | 11.3 | 66.2 | 2.29 | 100 |
| 10 | 7.0 | 65.9 | 1.00 | 100 |

In this experiment the pronounced reduction in intrinsic viscosity indicates that the modifying effect of the tertiary mercaptan is greatly enhanced by the presence of the mono-ether and that when so operating, considerable reduction in modifier might be effected without gel formation.

*Example III*

The experiment of Example I was repeated employing primary $C_{16}$ mercaptan as the modifier. In one test the modifier was activated by ten parts of ethylene glycol mono-phenyl ether while the other was maintained as a control. Data on the polymers is shown below.

| Ethylene Glycol Mono-Phenyl Ether | Conversion | Time | Benzene Solubility |
|---|---|---|---|
| Parts | Per cent | Hours | Per cent |
| 0 | 54.3 | 8 | 39.7 |
| 10 | 80.6 | 8 | 94.0 |
| 10 | 88.5 | 10 | 95.1 |

Since certain changes may be made in carrying out the above process without departing from the scope of the invention, it is intended that all matters contained in the foregoing description of the invention shall be interpreted as illustrative and not in a limiting sense.

We claim:

1. In a process for the polymerization of an aliphatic conjugated diolefin in an aqueous emulsion, the improvement which comprises carrying out the polymerization in the presence of tertiary hexadecyl mercaptan in an amount not greater than 2 weight per cent and from 1 to 20 weight per cent based on the weight of monomeric material subjected to polymerization of a monoether of ethylene glycol selected from the group consisting of ethyl, propyl, isopropyl, butyl, isobutyl, secondary butyl, tertiary butyl, amyl, phenyl and tolyl mono-ethers of ethylene glycol.

2. The process of claim 1 in which said diolefin is copolymerized with another monomer copolymerizable therewith in aqueous emulsion, and the amount of said monoether of ethylene glycol is from 5 to 10 per cent by weight of said monomeric material.

3. In a process for the polymerization of 1,3-butadiene and styrene in an aqueous emulsion, the improvement which comprises carrying out the polymerization in the presence of tertiary hexadecyl mercaptan in an amount not greater than 2 weight per cent and from about 5 to about 10 weight per cent based on the weight of the monomers of ethylene glycol mono-phenyl ether.

4. A process for the production of a copolymer of butadiene and styrene which comprises forming an aqueous emulsion comprising approximately 75 parts by weight butadiene and 25 parts by weight styrene, and carrying out the polymerization in the presence of about 1.6 parts by weight of tertiary hexadecyl mercaptan and 10 parts by weight of ethylene glycol mono-phenyl ether.

WALTER A. SCHULZE.
WILLIE W. CROUCH.

REFERENCES CITED

The following references are of record in the file of this patent:

UNITED STATES PATENTS

| Number | Name | Date |
|---|---|---|
| 2,222,967 | Wollthan | Nov. 26, 1940 |
| 2,281,613 | Wollthan | May 5, 1942 |
| 2,378,030 | Olin | June 12, 1945 |
| 2,386,764 | Zwicker | Oct. 16, 1945 |
| 2,472,232 | Schulze | June 7, 1949 |

OTHER REFERENCES

Whitmore, "Organic Chemistry," Van Nostrand, 1937, pages 372 and 373.